United States Patent
Mindes

(10) Patent No.: US 7,125,329 B2
(45) Date of Patent: Oct. 24, 2006

(54) SHELLFISH EATING TOOL

(76) Inventor: Evelyne N. Mindes, P.O. Box 24100, Los Angeles, CA (US) 90024

( * ) Notice: Subject to any disclaimer, the term of this patent is extended or adjusted under 35 U.S.C. 154(b) by 0 days.

(21) Appl. No.: 10/963,170

(22) Filed: Oct. 12, 2004

(65) Prior Publication Data

US 2006/0099896 A1    May 11, 2006

(51) Int. Cl.
A22C 29/02    (2006.01)

(52) U.S. Cl. .......................................... 452/3

(58) Field of Classification Search ................ 452/2–6
See application file for complete search history.

(56) References Cited

U.S. PATENT DOCUMENTS

| | | | | |
|---|---|---|---|---|
| D162,924 S | * | 4/1951 | Becherer | D7/693 |
| 2,594,205 A | * | 4/1952 | Paoli | 452/3 |
| 2,707,325 A | | 5/1955 | Cripps | |
| 2,795,006 A | * | 6/1957 | Stephenson | 452/105 |
| 2,840,851 A | * | 7/1958 | Verlander | 452/3 |
| 3,209,394 A | | 10/1965 | Hall et al. | |
| 3,353,207 A | * | 11/1967 | Weinberger | 452/3 |
| 4,172,306 A | | 10/1979 | Hopkins | |
| 4,200,961 A | | 5/1980 | Mueller | |
| 4,519,136 A | | 5/1985 | Walker | |
| 4,569,103 A | | 2/1986 | Taurinskas | |
| D304,797 S | | 11/1989 | Perkins | |
| 5,080,629 A | | 1/1992 | Ellison | |
| 5,232,395 A | * | 8/1993 | Rushing | 452/105 |
| 5,403,230 A | * | 4/1995 | Capriglione, Sr. | 452/6 |
| 5,586,931 A | | 12/1996 | Williams, Jr. | |
| 5,613,904 A | * | 3/1997 | LaSalle et al. | 452/6 |
| D386,362 S | | 11/1997 | LaSalle et al. | |
| 6,503,137 B1 | * | 1/2003 | Maille | 452/17 |

* cited by examiner

Primary Examiner—Thomas Price
(74) Attorney, Agent, or Firm—Robert J. Lauson; Lauson & Associates

(57) ABSTRACT

Exemplary embodiments provided herein may include a system and method for opening shellfish shells and extracting items therefrom, including a body having a first end, a second end and a middle portion therebetween, wherein the first end includes a first and second protuberance in spaced relation to each other to facilitate the opening of a shellfish shell, and wherein the second end comprises a probe portion configured to facilitate extracting items from the shellfish.

5 Claims, 2 Drawing Sheets

SHELLFISH EATING TOOL

BACKGROUND

Shellfish or crustaceans such as shrimp and crabs may be frequently prepared for eating by boiling the shellfish in water and then serving the cooked products still in the shell. The shell may have to be removed or broken away from the meat before the meat can then be extracted for consumption. Boiling or broiling of a shellfish or crustacean, such as a crab, may not change the characteristics of the shell in that it may still be relatively hard and brittle.

It may have been common practice for many years to use a nutcracker-type instrument to crack the shells of crab legs or other types of shellfish in order to facilitate removal of the shellfish meat from the protective shell. These utensils may have found wide-spread acceptance for opening of shellfish shells, primarily because there may have been no reasonable alternative system or method. However, the nutcracker-type utensils may be relatively expensive and present restaurants with a cost problem because of the relatively high percentage of loss that is experienced as a result of customer pilferage. Furthermore, these utensils may not be particularly useful in the case of shells that are somewhat soft, and mere cracking of the shell often does not allow a person to easily remove meat from the cracked shell.

Many persons experiencing frustration with the inadequacy of nutcracker-type utensils for opening crab leg shells, particularly in circumstances where the shell is somewhat soft but of tough characteristics, may resort to the use of a common table fork in an effort to sever the shell. One of the tines of the fork may be inserted under the shell and the user may then lift up on the fork handle in an effort to tear the shell body. Although this may accomplish the intended result in certain instances, many times such misuse of the fork may result in bending of the fork tine, thus again causing the restaurant losses because of the cost of replacing bent forks.

Furthermore, once the shell is cracked, it may be difficult to extract the meat portion and/or other items from the crustacean. What is needed is a system and method for opening the shell, and extracting the meat portion and other items from a crustacean.

SUMMARY

Exemplary embodiments provided herein may include a system and method for opening shellfish shells and extracting items therefrom, including a body having a first end, a second end and a middle portion therebetween, wherein the first end includes a first and second protuberance in spaced relation to each other to facilitate the opening of a shellfish shell, and wherein the second end comprises a probe portion configured to facilitate extracting items from the shellfish.

DETAILED DESCRIPTION

The detailed description set forth below in connection with the appended drawings is intended as a description of exemplary embodiments and is not intended to represent the only forms in which the exemplary embodiments may be constructed and/or utilized. The description sets forth the functions and the sequence for constructing and operating exemplary embodiments in connection with the illustrated embodiments. However, it is to be understood that the same or equivalent functions and sequences may be accomplished by different embodiments that are also intended to be encompassed within the spirit and scope of this disclosure.

Figure 1:
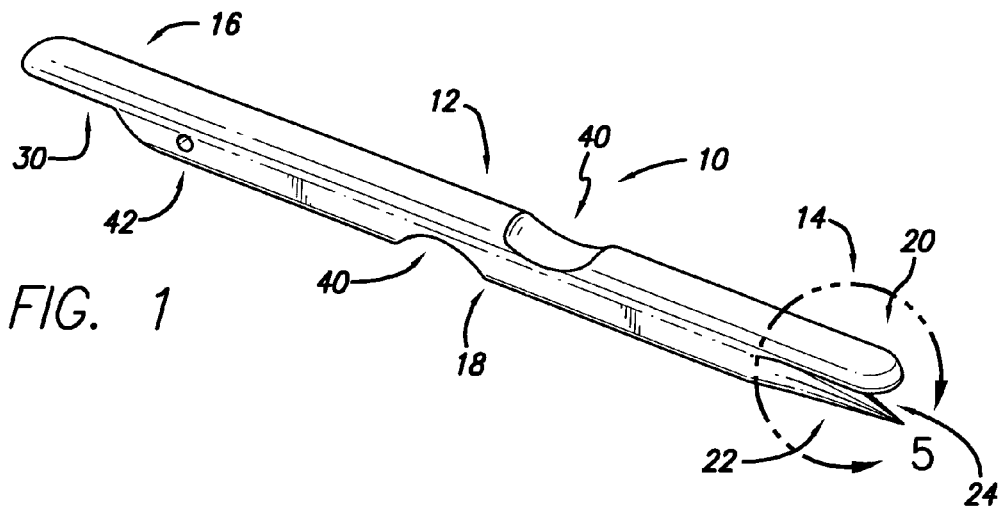
FIG. 1 is a perspective view of a system according to an exemplary embodiment.

A shellfish and/or crustacean opening and extracting system is shown in FIG. 1, generally at 10. System 10 may include a body 12 which may include a first end 14 and a second end 16. Body 12 may further include a middle portion 18 between first end 14 and second end 16.

First end 14 may include a first protuberance 20 and second protuberance 22 in a spaced relation to first protuberance 20. Second protuberance 22 may have an edge 24 which may have a generally knife-like or cutting configuration. First protuberance 20 may include a flat portion, which may generally face second protuberance 22. With this configuration, second protuberance 22 may extend underneath the shell of, or into the shellfish and/or crustacean, and the shell may slide along the flat portion of first protuberance 20.

Second protuberance 22 may be configured to cut, break and/or otherwise open the shell of the shellfish and/or crustacean. Protuberances 20 and 22 may be one to five centimeters in length extending away from the system 10 however other dimensions may be utilized as desired. Similarly the protuberances 20 and 22 may be in different spaced relationships such that they will facilitate different uses for different types, and/or thicknesses of shellfish and/or crustacean shells, and the like.

Middle portion 18 may include indentions 40 which may be configured to receive fingers of a user such that torque and/or other forces may be applied to system 10, and consequently transferred to the shell of the shellfish and/or crustacean to aid in the opening of the shell.

Second end 16 may include a probe portion 30 which may be configured to extend into the shellfish and/or crustacean to remove the meat portion or other items and/or portions, as desired. The second end 16 may also include an aperture 42 which may be utilized to hold a security chain or other device, as desired. Aperture 42 may also be utilized to attach some other device, such as a securing and/or security device, to system 10 such that a restaurant patron may not easily steal or remove the system 10 from a restaurant or other establishment.

With this configuration a user may break the shell of a shellfish and/or crustacean, such as a crab leg, then reverse the system 10 to utilize probe portion 30 to more easily extract the meat or other portion of the shellfish and/or crustacean. This may allow the user to not use their fingers or other devices to extract the meat and/or other items from a shellfish and/or crustacean.

Figure 2:
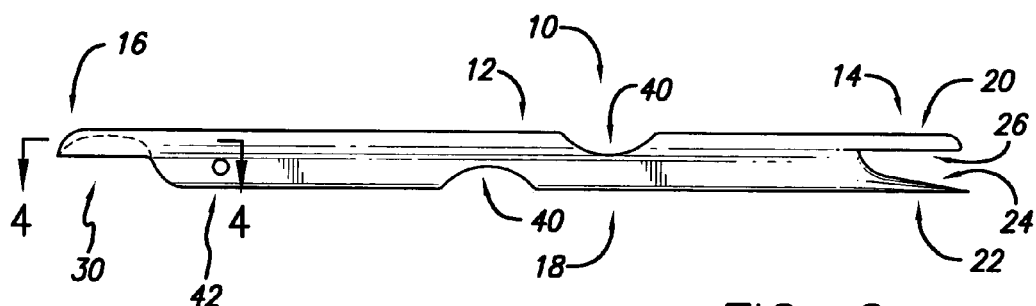
FIG. 2 is a side elevational view of a system according to an exemplary embodiment.

FIG. 2 shows a side elevational view of an opening and extraction system, generally at 10. Again system 10 includes a body portion 12 which may have a first end 14, a second end 16, and a middle portion 18 therebetween. Again front portion 14 may include a generally knife-like second protuberance 22. It will be appreciated that other configurations for protuberance 22 may be utilized to facilitate the opening of the shellfish and/or crustacean. As shown, second protuberance 22 slopes gradually from the outward edge of the system 10 toward the inner portion. This may facilitate insertion into a shellfish and/or crustacean, or portion of a shellfish and/or crustacean, as well as facilitate the opening, cutting and/or cracking action of the system.

Middle portion 18 again may include indentions 40 which may be configured to receive the fingers of a user. Typically a user may place their thumb on the top of the system 10 and their index finger on the bottom of system 10 to impart torque upon the shellfish and/or crustacean. Again second end 16 may include a probe portion 30 and an aperture 42.

First protuberance 20 may include a generally flat portion 26, which may facilitate the system 10 sliding along the outer portion of the shellfish and/or crustacean shell. This configuration may enhance the opening ability of the system 10 to enable a user to better utilize system 10.

Figure 3:
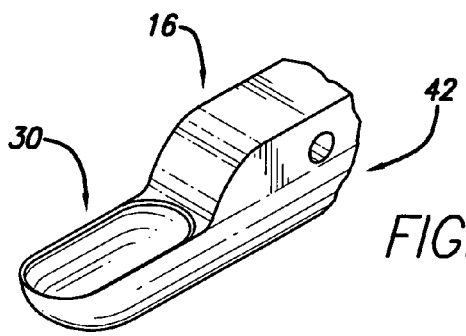
FIG. 3 is more detailed, inverted perspective view of a second end of a system according to an exemplary embodiment.

FIG. 3 shows a more detailed perspective view of second end 16. As shown probe portion 30 may be generally scoop, spoon or cup-shaped to facilitate the removal of meat and/or other items from the shellfish and/or crustacean however, other configurations may be utilized without straying from the concepts disclosed herein.

Figure 4:
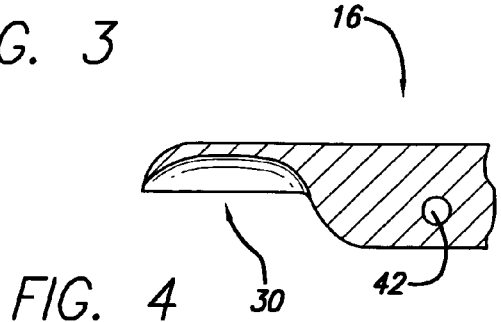
FIG. 4 is a sectional view of a second end of the exemplary embodiment of FIG. 2 along line 4—4.

FIG. 4 is a sectional view of second end 16 along lines 4—4 from FIG. 2. As shown probe portion 30 may have a depth of more than half of the thickness of probe portion 30. It will be appreciated that different lengths, widths and depths, among other characteristics, may be utilized for probe portion 30 without straying from the concepts disclosed herein, as desired.

Figure 5:
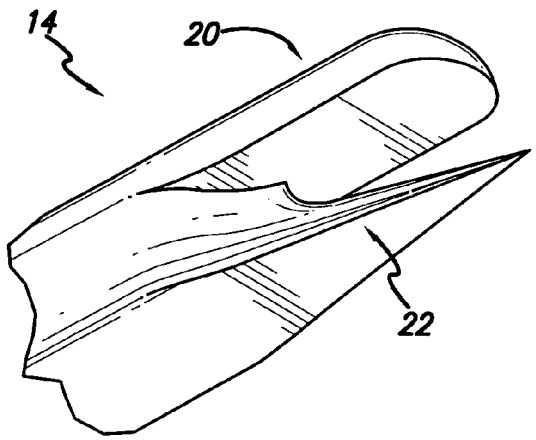
FIG. 5 is a more detailed view of a first end of a system according to an exemplary embodiment.

FIG. 5 shows a more detailed perspective view of first end 14 along line 5 from FIG. 1. As shown first protuberance 20 may have a flat portion that faces second protuberance 22 to facilitate the device sliding along the outer shell of a shellfish and/or crustacean. Again, second protuberance 22 may have a generally knife-like or other configuration that may be utilized for cutting or cracking the shell of a shellfish and/or crustacean, as desired.

Figure 6:
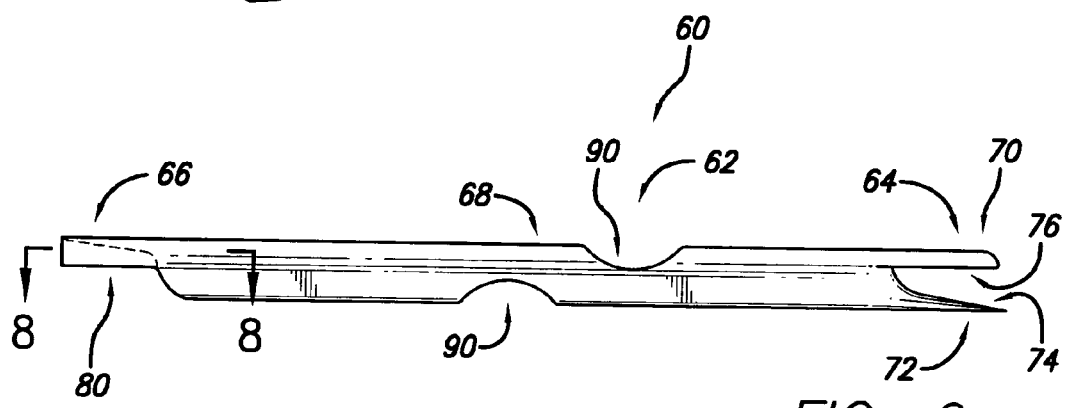
FIG. 6 is a side elevational view of a system according to an exemplary embodiment.

FIG. 6 is an exemplary embodiment of a shellfish and/or crustacean cracking and meat removal system, generally at 60. System 60 may include a body portion 62 which may include a first end 64 and a second end 66. Furthermore body portion 62 may include a middle portion 68 between first end 64 and second end 66.

First end 64 may include a first protuberance 70 and a second protuberance 72 in a similar configuration to exemplary embodiments disclosed above. First protuberance 70 may include a generally flat portion 76, which may generally face second protuberance 72. Second protuberance 72 may include a generally knife-like portion 74, which may facilitate the opening of a shell or other item. It will be appreciated that although second protuberance 72 is shown as generally knife-like, other configurations, such as serrations, wedges, etc. may be utilized without straying from the concepts disclosed herein.

In this exemplary embodiment second end 66 includes a probe 80 which has a generally shovel-shape, or open-ended configuration. It will be appreciated that other configurations for probe 80 may be utilized without straying from the concepts disclosed herein. This configuration may facilitate the removal of meat and other portions from the inside of a shellfish and/or crustacean. Middle portion 68 may include indentions 90 which may facilitate the user imparting torque upon the shell of a shellfish and/or crustacean to more easily crack or break it open to reveal the contents therein, or to more easily extract the meat or other portion, as desired.

Figure 7:
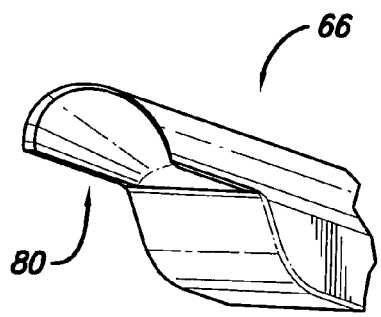
FIG. 7 is a perspective view of a second end of a system according to an exemplary embodiment.

FIG. 7 shows a more detailed perspective view of second end 66. As shown probe 80 may have a generally three-sided, shovel-type configuration. With this configuration the inside of the shell of the shellfish and/or crustacean may be more easily scraped to remove meat and other portions, as desired.

Figure 8:
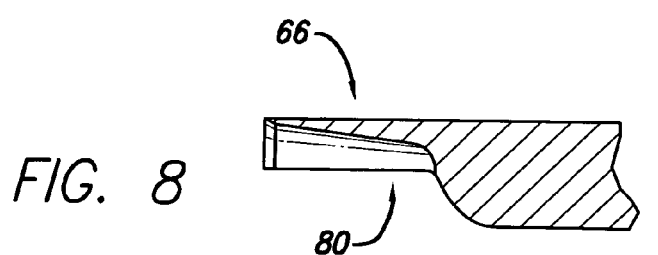
FIG. 8 is a sectional view of a second end of the exemplary embodiment of FIG. 6 along line 8—8.

FIG. 8 shows a sectional view along line 8—8 from FIG. 6 of second end 66. As shown the bottom of probe 80 may slope gradually from the exterior toward the interior of the system. It will be appreciated that other configurations may be utilized for probe portion 80 without straying from the concepts disclosed herein.

System 10 may be made from disposable plastic or durable stainless steel and/or other materials and/or combinations thereof. The disposable plastic embodiment may be utilized as a giveaway or one-time-use system. Stainless steel may be utilized as a reusable tool for restaurant-grade use. It will be appreciated however, that other materials such as plastics, woods, polymers, metals, and/or combinations thereof may be utilized, as desired.

System 10 may be approximately 4 to 7 inches long and 0.25 to 1.25 inches thick. The system may be a convenient disposable plastic or durable stainless steel tool used to facilitate the removal of meat in crab legs and other shellfish and/or crustaceans and portions of shellfish and/or crustaceans, as desired. It will be appreciated that other dimensions may be utilized for different uses, such as, but not limited to, different types of shellfish and/or crustaceans.

The first end of the system may slide into a leg or other portion and while the user presses upward, may split the shell, exposing the meat inside. The probe portion of the second end of the system may aid in removing the crab meat or other portions without the necessity for digging into the shell with fingers. Exposure of the shell contents may be further enhanced by splitting the shell at both the top and the bottom edges.

It will be appreciated that other dimensions may be utilized for different sized shellfish and/or crustaceans. It will also be appreciated that many different colors and materials may be utilized, along with advertising, without straying from the concepts disclosed herein. Some embodiments may be produced inexpensively with advertising such that restaurants and/or other advertisers may use them as a giveaway item, similar to chopsticks and other utensils.

In closing, it is to be understood that the exemplary embodiments described herein are illustrative of the principles of the exemplary embodiments. Other modifications that may be employed are within the scope of this disclosure. Thus, by way of example, but not of limitation, alternative configurations may be utilized in accordance with the teachings herein. Accordingly, the drawings and description are illustrative and not meant to be a limitation thereof.

What is claimed is:

1. A tool for opening shellfish shells and extracting items therefrom, comprising: a body having a first end, a second end and a middle portion theretween; wherein said first end comprises a first protuberance generally substantially flat member, and an elongate generally knife-like second protuberance, in spaced relation to each other to facilitate the opening of a shell fish shell and insertion therein; wherein said second end comprises a generally scoop-shaped probe portion configured to facilitate extracting items from the shellfish, wherein the elongate generally knife-like second protuberance has a sharp edge extending away from and inclined relative the generally substantial flat member first protuberance, wherein the generally flat member first protuberance is approximately transverse to the generally knife-like second protuberance.

2. The tool of claim 1, wherein said body further comprises an aperture configured to receive a securing device.

3. The tool of claim 1, wherein said middle portion comprises indentations configured to receive the fingers of a user to facilitate transferring torque to the shellfish.

4. The tool of claim 1, wherein the probe portion is generally three-sided, shovel-shaped.

5. The tool of claim 1, wherein the generally flat surface first protuberance is approximately transverse to the generally knife-like second protuberance.

* * * * *

UNITED STATES PATENT AND TRADEMARK OFFICE
CERTIFICATE OF CORRECTION

PATENT NO. : 7,125,329 B2 Page 1 of 1
APPLICATION NO. : 10/963170
DATED : October 24, 2006
INVENTOR(S) : Evelyne N. Mindes It is certified that error appears in the above-identified patent and that said Letters Patent is hereby corrected as shown below:

On the Title page, Item (76) should read -- Inventors: Evelyne N. Mindes, P.O. Box 24110, Los Angeles, CA (US) 90024 --.

Signed and Sealed this

Twenty-third Day of January, 2007

JON W. DUDAS
*Director of the United States Patent and Trademark Office*